US011092425B2

(12) United States Patent
Xu et al.

(10) Patent No.: US 11,092,425 B2
(45) Date of Patent: Aug. 17, 2021

(54) TELECENTRIC AND BROADBAND ACHROMATIC OBJECTIVE LENS SYSTEMS

(71) Applicant: University of Rochester, Rochester, NY (US)

(72) Inventors: Di Xu, Beijing (CN); Romita Chaudhuri, Kolkata (IN); Jannick P. Rolland-Thompson, Seneca Falls, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 16/446,859

(22) Filed: Jun. 20, 2019

(65) Prior Publication Data

US 2020/0011651 A1  Jan. 9, 2020

Related U.S. Application Data

(60) Provisional application No. 62/694,345, filed on Jul. 5, 2018.

(51) Int. Cl.
*G02B 13/22* (2006.01)
*G01B 9/02* (2006.01)
*G01B 11/24* (2006.01)
*G02B 27/09* (2006.01)
*G02B 26/10* (2006.01)

(52) U.S. Cl.
CPC ...... *G01B 9/02056* (2013.01); *G01B 9/02091* (2013.01); *G01B 11/2441* (2013.01); *G02B 13/22* (2013.01); *G02B 27/0955* (2013.01); *G02B 26/101* (2013.01)

(58) Field of Classification Search
CPC ............ G01B 9/02056; G01B 9/02091; G01B 9/02007; G01B 11/2441; G02B 13/22; G02B 27/0955; G02B 26/101; G02B 9/60; G02B 13/001; G02B 13/0015
See application file for complete search history.

(56) References Cited

U.S. PATENT DOCUMENTS

| | | | |
|---|---|---|---|
| 5,880,838 A | * | 3/1999 | Marx ..................... G01B 11/02 250/237 G |
| 7,978,338 B2 | | 7/2011 | De Groot et al. |

(Continued)

OTHER PUBLICATIONS

Xu et al. "Telecentric broadband objective lenses for optical coherence tomography (OCT) in the context of low uncertainty metrology of freeform optical components: from design to testing for wavefront and telecentricity," Optics Express, vol. 27, No. 5, Mar. 4, 2019 (17 pages).

(Continued)

*Primary Examiner* — Jonathan M Hansen
(74) *Attorney, Agent, or Firm* — Andrew J. Anderson, Esq.; Thomas B. Ryan; Harter Secrest & Emery LLP (57) ABSTRACT

Optical coherence tomography metrology systems with two highly telecentric objective lenses wherein one or both telecentric objectives can be arranged in a pseudo-bistatic configuration. One featured telecentric objective has a large scanning field of view relevant for broadband laser scanning applications where low uncertainty measurements are desired. Another featured telecentric objective has a large image space NA relevant as a standalone microscope objective or as a probing objective for optical coordinate measurement machines.

19 Claims, 8 Drawing Sheets

(56) References Cited

U.S. PATENT DOCUMENTS

| | | | |
|---|---|---|---|
| 9,867,536 B2 | 1/2018 | Izatt et al. | |
| 9,939,633 B2 | 4/2018 | De Loor | |
| 2008/0106696 A1 | 5/2008 | Buckland et al. | |
| 2010/0280315 A1* | 11/2010 | Pan | A61B 5/0066 600/109 |
| 2016/0327779 A1* | 11/2016 | Hillman | G02B 23/04 |
| 2019/0195615 A1 | 6/2019 | Xu et al. | |
| 2019/0278073 A1* | 9/2019 | Hillman | G02B 21/361 |

OTHER PUBLICATIONS

Araki et al. "Development of F-Theta Lens for UV Lasers", Sei Technical Review—No. 69,2009 (7 pages).

Cao et al. "Beam Steering: Parallel projection galvo scanning enables materials processing of freeform surfaces", 2013, Retrieved from: https://www.laserfocusworld.com/software-accessories/positioning-support-accessories/article/16556839/beam-steering-parallel-projection-galvo-scanning-enables-materials-processing-of-freeform-surfaces.

Special Optics "Scanning Lens Theory", downloaded Apr. 2018 from specialoptics.com (2 pages).

* cited by examiner

TELECENTRIC AND BROADBAND ACHROMATIC OBJECTIVE LENS SYSTEMS

STATEMENT REGARDING FEDERALLY SPONSORED RESEARCH OR DEVELOPMENT

This invention was made with government support under IIP-1338898 and IIP-1338877 awarded by National Science Foundation. The government has certain rights in the invention.

TECHNICAL FIELD

Non-contact, low uncertainty metrology of components, such as freeform optical components, involves a scanning and focusing system with telecentric and broadband objective lenses that can be used in metrology systems such as optical coherence tomography (OCT) systems.

BACKGROUND

Freeform optical components provide opportunities for improving both the performance and packaging of optical systems. However, the freeform optical components, whose surfaces can vary in unique ways in relation to conventional optical components having more regular geometric forms, can be difficult to measure with existing metrology systems to desired minimal levels of uncertainty. The measurement uncertainties of current measurement systems limit both reliable feedback during the manufacture of freeform optical components and quality assessments of the freeform optical components in their final form.

As a goal, the measurement uncertainty is preferably one order of magnitude lower than the specified design tolerance of an optical component under test. For many optical components, including freeform optical components, the specified form tolerance may be in the range of $\lambda/2$ to $\lambda/4$ peak-to-valley, where $\lambda$ is a given wavelength of light, which suggests an uncertainty of measurement in the range of tens of nanometers for wavelengths in the visible spectrum.

Requirements for such low uncertainty are problematic for many optical systems including OCT systems in which measurement resolution is closely related to the bandwidth over which the measurements are taken. In addition, for objectives used in OCT optical scanning operations, the design parameters such as telecentricity, distortion mapping, image plane flatness, and residual wavefront error over the broad bandwidth of wavelengths can all affect the amount of measurement uncertainty. As such, conventional objective lenses have been found inadequate for achieving the desired limits of measurement uncertainty.

The measurement of optical components with high surface slopes and sags, particularly such surfaces that are specularly reflective, poses additional problems for signal throughput associated with collecting reflected light for measurement. For example, a typical OCT sample arm configuration is monostatic, i.e. the numerical aperture (NA) of a probing beam through a telecentric objective forms a solid angle cone that collects the back-reflected or back-scattered light signal from the optical component under test. As such, some of the back reflected light from higher slope surfaces may be excluded by the limited NA of the objective, reducing the measurement signal-to-noise ratio.

Available configurations for the signal throughput issue compromise other performance goals. For example, increasing the NA of the objective lens generally decreases the depth of focus and the associated measurable range of component sag. Reorienting or otherwise moving the objective lens adds another source of uncertainty, which must be calibrated for in the measurement.

SUMMARY

Descriptions are provided of OCT systems with two highly telecentric objective lenses including a pseudo-bistatic configuration for one or both objective lenses. Objective lens designs are presented meeting performance criteria set for low uncertainty measurements having regard for impacts of telecentricity, distortion mapping, image plane flatness, and residual wavefront error on the final measurements. One lens system has a large scanning field of view (FOV) and may be relevant for broadband laser scanning applications where low uncertainty measurements are desired. The other lens system has a large image space NA and may be relevant as a standalone microscope objective lens or as a probing objective lens for optical coordinate measurement machines (CMMs).

One or more embodiments feature a pseudo-bistatic objective lens system for measuring a sample having a given range of slopes. A beam source together with a beam-shaping optic directs a probing beam through a limited area of the entrance pupil of a telecentric objective. The telecentric objective focuses the probing beam to spots on the sample through an effective numerical aperture that is smaller than the numerical aperture $NA_C$ of the telecentric objective through which a signal beam can be collected from the spots for extending a depth of focus through which the spots are illuminated. The numerical aperture $NA_C$ of the telecentric objective is set in accordance with the following relationship:

$$NA_C = \sin(\theta_P + 2\alpha_{max})$$

where $\theta_P$ is one-half of a range of angles through which the probing beam is focused, and $\alpha_{max}$ is equal to or greater than $\theta_P$ for returning the signal beam as specularly reflected from one or more of the spots to an offset area of the entrance pupil that is located beyond the limited area of the entrance pupil through which the probing beam is directed. In this way, the probing beam and the signal beam can propagate through entirely different volumes of the telecentric objective in a pseudo-bistatic condition.

A beam steering device can be arranged for directing the probing beam through the limited area of the entrance pupil at sequentially varying orientations, and the telecentric objective can be arranged to focus the varying orientation probing beam over a range of field positions for sequentially illuminating different spots on the sample. The telecentric objective collects the signal beam reflected from the spots for filling different areas of the entrance pupil corresponding to different slopes at which the spots are illuminated.

A measuring system for surfaces, including freeform surfaces, exhibiting a range of slopes includes in accordance with one or more embodiments emitting a source beam containing a range of wavelengths in a simultaneous or sequential fashion spanning a bandwidth of at least 300 nm. At least a portion of the source beam is directed through a limited area of an entrance pupil of a telecentric objective as a probing beam at sequentially varying orientations. The varying orientation probing beam is focused through an effective numerical aperture within the telecentric objective that is smaller than the numerical aperture of the telecentric objective over a range of field positions of the telecentric objective for sequentially illuminating different spots on a surface. A corresponding signal beam that is reflected from the sequentially illuminated spots is collected for filling different areas of the entrance pupil corresponding to different slopes of the surface at which the spots are illuminated. A portion of the source beam or the probing beam is conveyed along a reference arm as a reference beam, and the reference beam is combined with the signal beam for forming a measuring beam that is directed to a detector. Interference phases of the measuring beam are evaluated over the bandwidth of wavelengths for measuring surface heights of the illuminated spots.

The numerical aperture of the telecentric objective can be set in relation to the range of angles through which the probing beam is focused and a given maximum inclination angle of a surface normal of the illuminated spots to the optical axis of the telecentric objective in accordance with the relationships set forth above for $NA_C$. The source beam is sized to occupy the limited area of the entrance pupil, and the different areas of the entrance pupil filled by the collected signal beam progressively depart from the limited area of the entrance pupil with increasing inclination angles of the surface normal of the illuminated spots to the optical axis of the telecentric objective. The focused probing beam can be divided into a sample beam that is directed to the surface and the reference beam that is conveyed along the reference arm to shorten any paths not in common between the sample and reference beams.

One or more embodiments also feature an OCT system including first and second telecentric objectives, where the numerical aperture of the first telecentric objective is greater that the numerical aperture of the second telecentric objective. A beam source produces an illumination beam containing a range of wavelengths in a simultaneous or sequential fashion spanning a bandwidth of at least 300 nm. A switching system directs the illumination beam to one or the other of the first and second telecentric objectives. A beam steering device directs the illumination beam through a limited area of the entrance pupil of at least one of the first and second telecentric objectives at sequentially varying orientations, and the at least one telecentric objective is arranged to focus the varying orientation illumination beam through an effective numerical aperture that is smaller than the numerical aperture of the at least one telecentric objective over a range of field positions for sequentially illuminating different spots on the sample. One or more beamsplitters (a) divide the illumination beam into one or more sample beams that are directed along respective sample arms to the sample and one or more reference beams that are directed along at least one reference arm to a reference reflector and (b) combine the one or more sample beams as reflected from the sample with the one or more reference beams reflected from the reference reflector into a measurement beam that is directed to a detector/processor.

A beam steering device can be associated with the first telecentric objective and a mechanical actuation system can be associated with the second telecentric objective. The mechanical actuation system can provide for relatively moving the second telecentric objective with respect to the sample.

Another embodiment features a telecentric objective including a first cemented doublet, a negative meniscus, a positive meniscus, and second and third cemented doublets in order from an entrance pupil. The first cemented doublet contributes positive optical power, the second cemented doublet contributes negative optical power, and the third cemented doublet contributes positive optical power. The objective also features a scanning field of view diameter of 40 mm, a maximum root mean squared wavefront error no more than $0.07\lambda$ at 900 nm over the field of view, and a maximum nominal telecentricity of 1.3 seconds of arc over the field of view. The telecentric objective can also be broadband achromatic over a continuous spectral range from 720 nm to 1080 nm wavelengths.

Another embodiment features a telecentric objective including first, second, and third cemented doublets, one bi-convex lens, and one positive meniscus lens in order from an entrance pupil. The first cemented doublet contributes positive optical power, the second and third cemented doublets together contribute negative optical power. The objective also features a numerical aperture of 0.55, a maximum root mean squared wavefront error no more than $0.07\lambda$ at 900 nm, and a maximum nominal telecentricity of 0.07 degrees. This telecentric objective can also be broadband achromatic over a continuous spectral range from 720 nm to 1080 nm wavelengths.

Embodiments also feature a telecentric objective for an OCT system arranged for measuring sample surfaces varying in sag and slope within a given range of measurement error designed according to steps of:

(a) equating measurement error due to a departure from telecentricity over the varying sag and slope of the sample surfaces;
(b) setting a target telecentricity error tolerance for the telecentric objective proximate to the associated range of measurement error for measuring the sample surfaces;
(c) optimizing surfaces curvatures, spacing, and material choices for a set of optical elements to achieve diffraction limited performance while balancing imaging aberrations and pupil aberrations and minimizing angles of incidence to the element surfaces; and
(d) further constraining the tolerance for telecentricity error by adjusting a stop location of the telecentric objective.

The telecentric objective can be arranged to exhibit diffraction limited performance over a 300 nm spectral bandwidth, and the set of optical elements can be arranged to include no more than five single or compound elements. For example, the five elements can include three cemented doublets. The telecentric objective is also preferably subject to a design step of maintaining the target tolerance for telecentricity error during the step of optimizing.

DETAILED DESCRIPTION OF THE INVENTION

FIGS. 1 through 4 depict various layouts of various OCT measurement systems, 10, 50, 90 and 100, combining two different highly telecentric objective lenses having different specialized capabilities for collecting measurement data. Components in common between the systems share the same reference characters.

Figure 1:
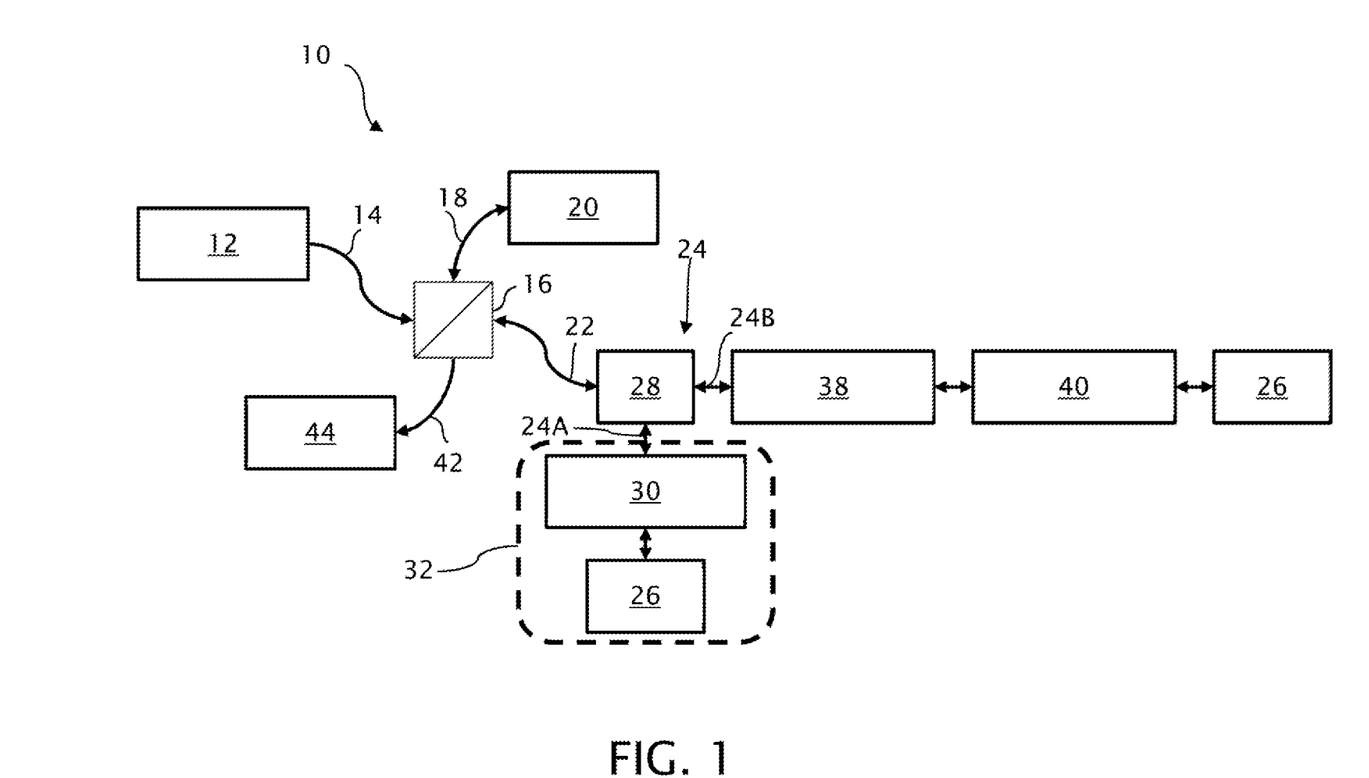
FIG. 1 is a diagram showing a first example of an OCT system combining a large NA objective lens with a large FOV objective lens operating in a scanning mode for measuring a sample volume.

The integrated OCT system 10 of FIG. 1 features a broadband source 12, which can be arranged for sequentially or simultaneously emitting a source beam 14 over a range of wavelengths sufficient to satisfy requirements for measurement accuracy. That is, the depth resolution with which distance measurement can be made is inversely proportional to the bandwidth. A beamsplitter 16 divides the source beam 14 into a reference beam 18 that travels along a reference arm 20 to and from a reference reflector (not shown) and a sample beam 22 that travels along a sample arm 24 to and from a sample volume 26.

The sample arm 24 is a compound sample arm providing two different routes 24A and 24B for the sample beam 22 to and from the sample volume 26 as determined by the position of a flip mirror 28. In a first position of the flip mirror 28, the sample beam 22 is directed along the first route 24A through a large NA objective lens 30, for taking highly laterally resolved measurements of the sample volume 26 over a limited FOV and a limited depth of focus. However, for measuring the sample volume 26 over a larger area and a larger range of distances, a mechanical actuation system 32 provides for moving (i.e., rotating or translating) one or both the sample volume 26 and the large NA objective lens 30. Such mechanical actuation systems are common among commercial optical CMMs.

In a second position of the flip mirror 28, the sample beam 22 is directed along the second route 24B through a beam scanning/optical relay 38 and a large FOV objective lens 40 for taking measurements of the sample volume 26 over a larger area and a larger depth of focus. Generally, the beam scanning/optical relay 38 directs the sample beam 22 in a collimated form through a beam steering device (not shown) located at the entrance pupil (or a conjugate thereof) of the large FOV objective lens 40 for translating the sample beam 22 in a focused form across sample volume 26 within the FOV of the objective lens 40. The beam steering device of the beam scanning/optical relay 38 can take a variety of known forms, such as a scanning mirror pivotable about two orthogonal axes under galvanometer control. Separately controlled mirrors pivotable about different axes could also be used from conjugate positions.

The sample beam 22 propagating along either route 24A or 24B to the sample volume 26 functions as an illumination beam that is focused by the respective objective lenses 30 and 40 to focal spots on or within the sample volume 26. Portions of the sample beam 22 reflected from the sample volume 26 are collected by the respective objective lenses 30 and 40 for propagation in an opposite direction along the respective routes 24A and 24B to the beamsplitter 16 where the sample beam 22 is recombined with the reference beam 18 and redirected as a measurement beam 42 to a detector/processor 44 for evaluating optical path length differences (OPDs) between the sample beam 22 and reference beam 18 portions of the measurement beam 42.

The detector/processor 44 includes a detector arranged for collecting intensity information over a succession or continuum of wavelengths emitted by the broadband source 12 and a processor arranged for interpreting the collected intensity information as a rate of change in interference phase as a function of a change in wavelength (normalized to wavenumber), which is equated to OPDs between the sample beam 22 and reference beam 18 portions of the measurement beam 42. The detector can collect the intensity information over a succession of different wavelengths in combination with the broadband source 12 being arranged to emit such a succession of different wavelength source beams 14. The detector can collect the intensity information over a continuum of different wavelengths in combination with the broadband source 12 being arranged to emit such a continuum of different wavelength source beams 14 by including a dispersive optic, such as found in a spectrometer, for focusing the different wavelengths over different recordable positions along the detector. The detector can be arranged as a single photodetector element or an array of photodetector elements such as photodiodes with an analog to digital converter.

While the range of wavelengths (more generally referenced as a range of beam frequencies), sets the depth resolution, the unambiguous interval of measurement is a function of the range beam frequencies divided by the number of evenly spaced samples over the range, which gives the beam frequency step size. That is, with the referenced change in phase considered as a modulation frequency, the beam frequency step size of the collected samples relates to the range of unique modulation frequencies that can be identified.

While the source beam 14 is further divided into other named beams such as the reference beam 18 and the sample beam 22 before being combined into the measurement beam 42, the light from the beam source 12 en route to the sample volume 26 and reference reflector can be more generally referred to as an illumination beam, and the light reflected from the sample volume 26 and reference reflector en route to the detector/processor 44 can be referred to as an imaging beam.

While the objective lenses 30 and 40 are shown in orthogonal orientations and the sample volume 26 is separately shown in relation to each of the objective lenses 30 and 40, the objective lenses 30 and 40 can be relatively oriented in different ways to each other and are relatively movable separately or collectively with respect to the sample volume 26 for operating nominally normal to the sample volume 26.

While the intensity information from the detector/processor 44 provides axial displacement information through the depth of focus of the objective lenses 30 and 40, other measurement systems are needed to locate points of measurement in a transverse plane normal to the axial direction of sample beam propagation. For example, relative motions imparted by the mechanical actuation system 32 can be monitored for measuring relative movements between the objective lens 30 and the sample volume 26 in the transverse plane as well as for measuring any relative movements between the objective lens 30 and the sample volume 26 in an axial direction required to maintain the sample beam measurements within the depth of focus of the objective lens 30. In addition, the angular motion imparted by the beam steerer of the beam scanning/optical relay 38 in either or both of two orthogonal directions can be monitored and converted into lateral displacements of the sample beam within the transverse plane in accordance with the known focusing characteristics of the objective lens 40. The monitored relative movements between the objective lens 30 and the sample volume 26 and between the focused sample beam 22 and the objective lens 40 are preferably communicated to the processor of the detector/processor 44 for spatially relating individual measurements of axial displacements to each other, such as for mapping the measurement data within a common three-dimensional coordinate system. Similar facilities can be provided for relatively moving and measuring the resultant movement of the sample volume 26 with respect to both objective lenses 30 and 40 and for relatively moving and measuring resultant movement of the objective lens 40 with respect to the sample volume 26.

Figure 2:
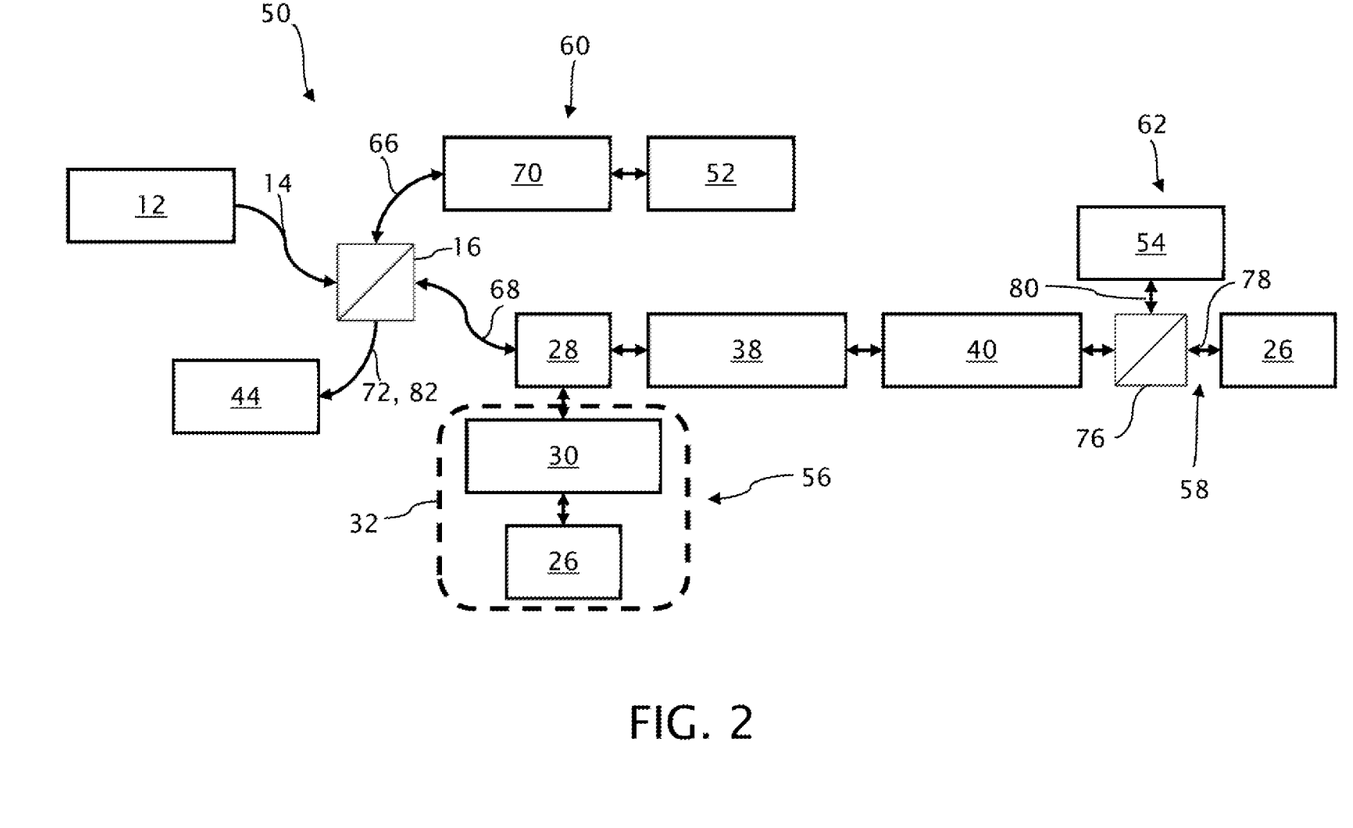
FIG. 2 is a diagram showing a second example of an OCT system combining similar objective lenses in an arrangement that incorporates the respective objective lenses within two separate interferometers.

The integrated OCT system 50 of FIG. 2 differs from the OCT system 10 of FIG. 1 by associating different reference arms 52 and 54 with different sample arms 56 and 58 for alternately operating two distinct interferometers 60 and 62. While the beamsplitter 16 divides the source beam 14 into two different beam portions 66 and 68 for propagation along separate pathways, the beam portions 66 and 68 do not function as respective reference and sample beams for both interferometers 60 and 62. The beam portion 66 is directed as a reference beam along the reference arm 52 of the interferometer 60. Depending upon the position of the flip mirror 28, the beam portion 68 is either directed as a sample beam along the sample arm 56 of the interferometer 60 or as a source beam toward the interferometer 62. In the former position of the flip mirror 28, where the beam portion 68 is directed as the sample beam of the interferometer 60, a flip beam block 70 allows the beam portion 66 to propagate to and from a reference reflector (not shown) of the reference arm 52. The beamsplitter 16 recombines the returning reference and sample beams of the interferometer 60 into a measuring beam 72 that is directed to the detector/processor 44.

In the latter position of the flip mirror 28, where the beam portion 68 is directed as a source beam toward the interferometer 62, the flip beam block 70 blocks the beam portion 66 from propagating to or from the reference arm 52. Like the sample beam 22 of the preceding embodiment, the beam scanning/optical relay 38 directs the beam portion 68 in a collimated form through a beam steering device (not shown) located at the entrance pupil (or a conjugate thereof) of the large FOV objective lens 40. However, upon focusing, the beam portion 68 encounters a beamsplitter 76 that divides the converging beam portion 68 (as a source beam) into a transmitted sample beam 78 that converges toward the sample volume 26 within the sample arm 58 and a reflected reference beam 80 that converges toward a reference reflector (not shown) of the reference arm 54. The beamsplitter 76 recombines the returning sample beam 78 reflected from the sample volume 26 with the returning reference beam 80 reflected from the reference reflector into a measuring beam 82 that propagates along a return path through the flip mirror 28 and the beamsplitter 16 to the detector/processor 44.

The operation of the flip mirror 28 together with the flip beam block 70 assures that the detector/processor 44 receives just one or the other of the measuring beams 72 or 82 from the respective interferometers 60 and 62. While the OCT system 50 requires two distinct reference arms 52 and 54, the arrangement significantly lengthens the common path length for the reference and sample portions of the source and measurement beams 14 and 82, thereby limiting disparate influences that might inadvertently affect OPDs between the reference and sample portions of the measuring beam 82 reaching the detector/processor 44.

Figure 3:
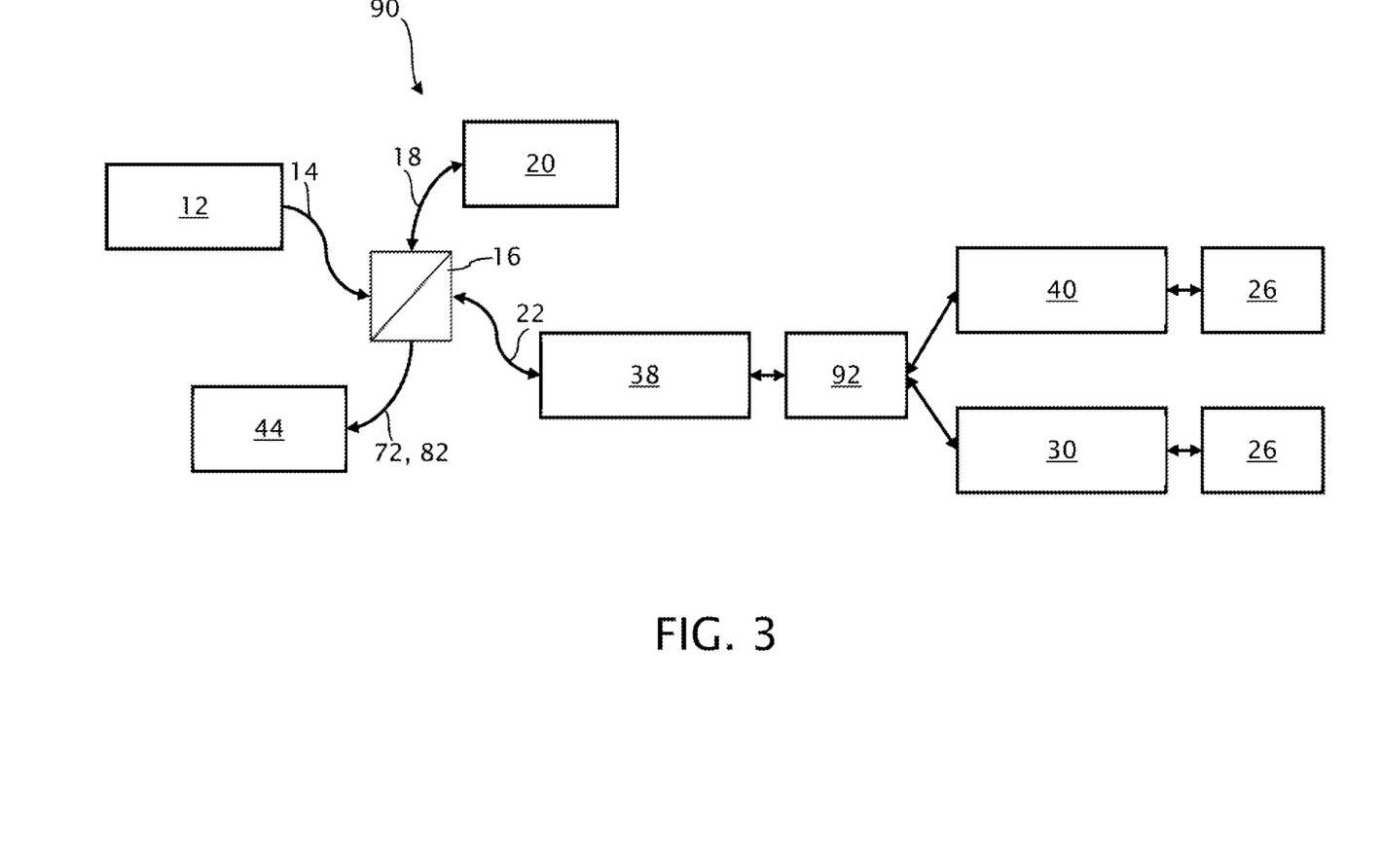
FIG. 3 is a diagram showing a third example of an OCT system with shared interferometric components including a beam scanning/optical relay capable of operating both objective lenses in a scanning mode.

The integrated OCT system 90 of FIG. 3, like the OCT system 10 of FIG. 1, consolidates components of two interferometers. However, the sample beam 22 is directed through the beam scanning/optical relay 38 before encountering a switch mount 92 that alternately directs the sample beam through the respective objective lenses 30 or 40 to the sample volume 26. The beam steering device (not shown) of the beam scanning/optical relay 38 can be located at one conjugate of a common entrance pupil of the objective lenses 30 and 40, and the optical relay portion (not shown) of the beam scanning/optical relay 38 together with the switch mount 92 alternately relays the common entrance pupil conjugate to an entrance pupil or other respective conjugate thereof associated with each objective lenses 30 and 40. In this way, a single beam steering device can vary the orientation of a collimated sample beam 22 within an entrance pupil conjugate of both objective lenses 30 and 40, and the switch mount 92 can direct the so-oriented sample beam 22 through a selected one or the other of the objective lenses 30 or 40 for directing sample beam 22 with different focusing characteristics across the sample volume 26. The varying angle of the sample beam 22 within the common entrance pupil conjugate results in different amounts of focused sample beam translation across the sample volume 26 in accordance with the focusing characteristics of the two objective lenses 30 and 40. While the actual entrance pupils of the objective lenses 30 and 40 can have different sizes, the collimated sample beam 22 can be sized to underfill both entrance pupils.

Figure 4:
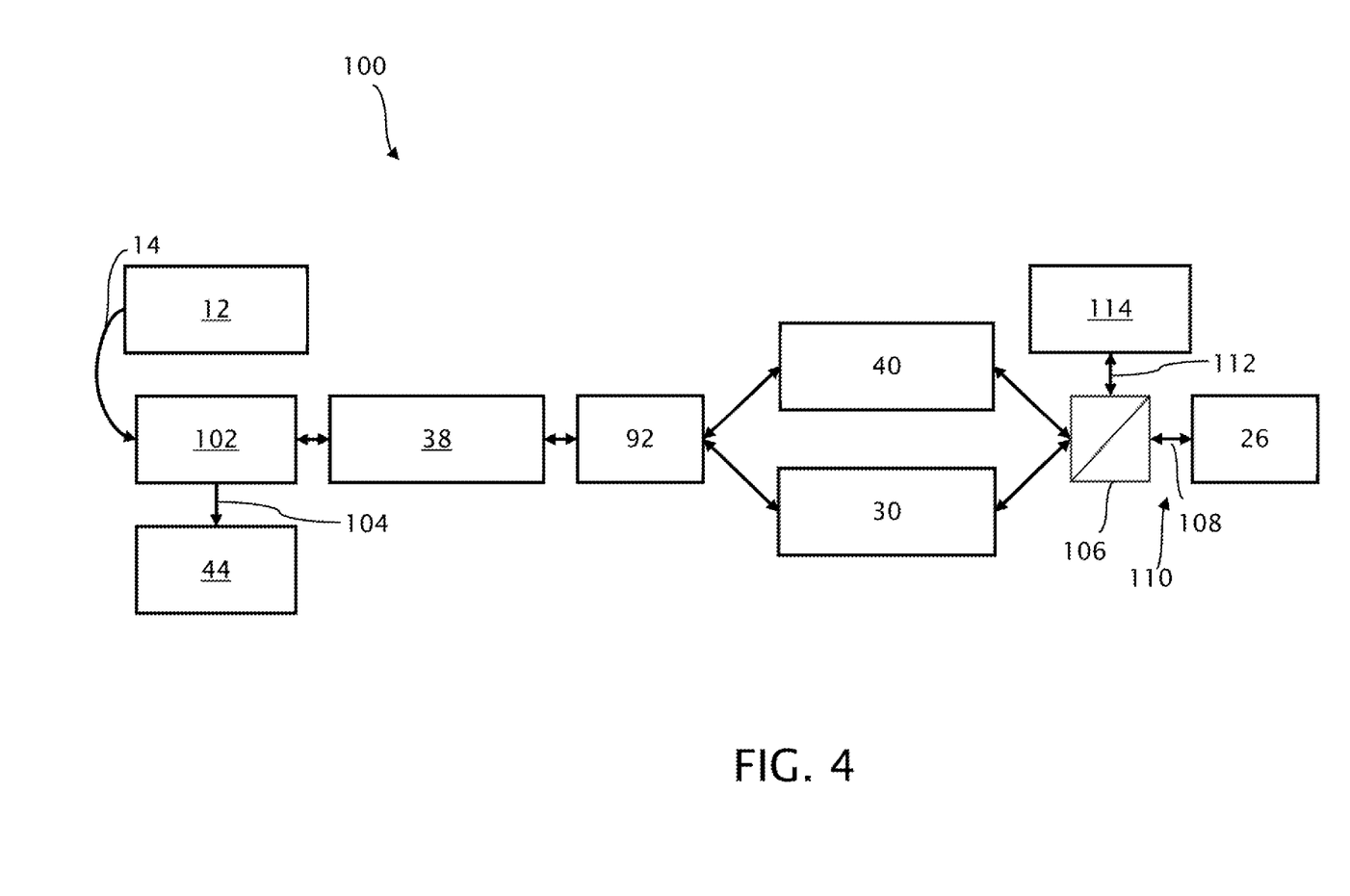
FIG. 4 is a diagram showing a fourth example of an OCT system sharing even more interferometric components including both the beam scanning/optical relay and a reference arm shared by both objective lenses.

The integrated OCT system 100 of FIG. 4 further consolidates components of two interferometers. A beam delivery system 102 directs the source beam 14 toward the two interferometers and directs a returning measurement beam 104 to the detector/processor 44. The focused outputs of the objective lenses 30 and 40 encounter a shared beamsplitter 106 that divides the source beam 14 focused through either of the objective lenses 30 and 40 into a sample beam 108 that converges toward the sample volume 26 along a sample arm 110 and a reference beam 112 that converges toward a reference reflector (not shown) along a reference arm 114. Reflections from the respective sample volume 26 and the reference reflector return the sample beam 108 and the reference beam 112 to the beamsplitter 106, which combines the sample and reference beams 108, 112 into the measurement beam 104 that returns through the beam delivery system 102 to the detector/processor 44.

The converging source beam 14 can be routed through the common beamsplitter 106 in a variety of ways including by the use of a flip mirror or by relatively displacing the beamsplitter 106 (together with the reference arm 114) between alignments with the respective objectives 30 and 40. The switch mount 92 could also be arranged to rotate or otherwise move the objective lenses 30 and 40 into and out of alignment with the beamsplitter 106. Both objective lenses 30 and 40 must also have working distances that can accommodate the beamsplitter 106 in advance of their respective focal points. The common reference arm 114 allows more ready and systematic comparison of the measurements captured through the two different objective lenses 30 and 40, and the close proximity of the beamsplitter 106 to the sample volume 26 extends the common path length for the source beam 14 while shortening the separate optical path lengths of both the sample arm 110 and the reference arm 114.

Figures 5, 5A:
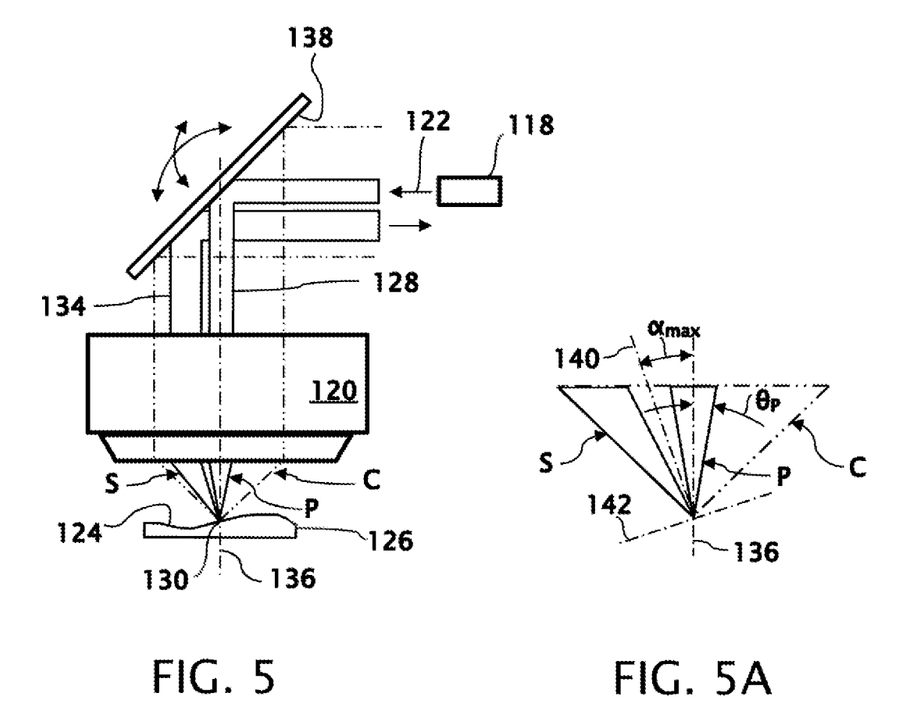
FIG. 5 is a diagram of an objective lens together with a scanning mirror in a pseudo-bistatic configuration in which a probing beam capable of scanning a sample surface is collected upon reflection from a sloped surface of the sample by the objective lens as a signal beam that passes through a different portion of the NA of the objective lens to the scanning mirror.
FIG. 5A is an enlarged diagram depicting relationships of the probing and sample beams within the NA of the objective lens.

FIG. 5 depicts a pseudo-bistatic scanning configuration of a highly telecentric objective lens 120 that may be used in any of the scanning arrangements of the preceding OCT systems. In the depicted embodiment, a collimated sample beam 122, having been collimated and appropriately sized by a beam-shaping optic 118, is directed through the objective lens 120 en route to and from a surface 124 of a sample 126 that is subject to measurement. The sample beam 122 en route to the sample surface 124 is designated as a probing beam 128 that converges through a focus 130 forming a correspondingly sized spot on the sample surface 124. The sample beam 122 as reflected from the spot on the sample surface 124 is designated as a signal beam 134.

The probing beam 128, which is shown centered about an optical axis 136 of the objective lens 120, is laterally translatable across the sample surface 124 in a parallel orientation by a pivoting motion of a scanning mirror 138, which is located at an entrance pupil (or conjugate thereof) of the objective lens 120. The angular orientation of the collimated probing beam 128 within the entrance pupil is transformed by the objective lens 120 into a corresponding lateral position of the focus 130 along a focal surface proximate the sample surface 124.

The probing beam 128 substantially underfills the entrance pupil and focuses through an effective numerical aperture $NA_P$ that is substantially smaller than the numerical aperture $NA_C$ of the objective lens 120. Thus, the range of angles through which the probing beam 128 is focused, which is shown as the cone P, is much smaller than the full range of angles through which the objective lens 120 collects light, which is shown in phantom line as the cone C. As such, the effective numerical aperture $NA_P$ of the probing beam 128 can be set independently of the numerical aperture $NA_C$ of the objective lens 120 based on a desired depth of focus for measuring sag variations on the sample surface 124 and any limitation on the diffraction limited spot size of the focus.

The larger size numerical aperture $NA_C$ of the objective lens 120 allows for the capture of light reflected as the signal beam 134 over a larger range of slopes along the sample surface 124. While the signal beam 134 returns to the entrance pupil in a collimated form parallel to the probing beam 128, the signal beam 134 as reflected from different angle slopes occupies different areas of the entrance pupil than the probing beam 128. For example, a cone of light S associated with the signal beam 134 occupies a different volume of the numerical aperture $NA_C$ as represented by the cone C than the cone of light P associated with the probing beam 128.

With reference to the enlarged schematic of FIG. 5A, the numerical aperture $NA_C$ of the objective lens 120 required to collect the signal beam 134 from a specular sample surface 124 in a pseudo-bistatic condition can be determined as follows:

$$NA_C = \sin(\theta_P + 2\alpha_{max})$$

where $\theta_P$ is the half cone angle by which the effective numerical aperture $NA_P$ of the probing beam 128 is determined and $\alpha_{max}$, in the pseudo-bistatic condition, is equal to or greater than $\theta_P$ for returning the signal beam as specularly reflected from one or more of the spots to an offset area of the entrance pupil that is located beyond the limited area of the entrance pupil through which the probing beam is directed. In this way, the probing beam and the signal beam can propagate through entirely different volumes of the telecentric objective in the pseudo-bistatic condition.

The angle $\alpha_{max}$ can also be regarded as a given maximum inclination (slope) angle of a surface normal 140 of the illuminated spots to the optical axis 136 of the telecentric objective. In the enlarged view of FIG. 5A, the surface normal 140 extends perpendicular to a tangent line 142 corresponding to a given maximum slope of the sample surface 124 from which the signal beam 134 can be collected. That is, the signal beam 134, as a specular reflection of the probing beam 128 and shown as the cone of light S, can be captured by the objective lens 120 up to the slope angle $\alpha_{max}$ while maintaining a desired depth of focus to accommodate sag variations. The slope angle $\alpha_{max}$ is preferably equal to or greater than the half cone angle $\theta_P$ to allow the signal beam 134 to fill a portion of the entrance pupil that does not overlap with the portion of the entrance pupil filled by the probing beam 128.

The objective lens 120 is required to be well-corrected over the full numerical aperture $NA_C$ to ensure that undesirable OPDs are not introduced into the signal beam 134. Operation of the scanning mirror 138 allows for the controlled displacement of the probing beam 128 in orthogonal directions for measuring all or a significant area of the sample surface 124 at a stationary position of the objective lens 120 with respect to the sample 126. However, the scanning mirror 138 could be pivoted about a single rotational axis for measuring points in one direction along of the sample surface 126, and the sample 126 could be relatively rotated or translated in another direction with respect to the objective lens 120 for measuring the remaining relatively displaced points on the sample surface 124.

In a monostatic system, the probing beam and the signal beam are directed through the same optics. In a bistatic system, the probing beam and the signal beam are directed through different optics. The scanning system of FIG. 5 can be described as a pseudo-bistatic system because the probing beam 128 and the signal beam 134 are arranged so that at non-zero slopes, the probing beam 128 and the signal beam 134 take different pathways through the objective lens 120. That is, the signal beam 134 can be collected through a remaining portion of the numerical aperture $NA_C$ that is not used by the probing beam 128, which requires the objective lens 120 to meet more stringent and uniform performance criterial over the full numerical aperture $NA_C$.

With reference to the OCT systems 10, 50, 90, and 100 of FIGS. 1 through 4, the same source or sample beam can be used to underfill the entrance pupils of either or both objective lenses 30 and 40. In the OCT systems 10 and 50 of FIGS. 1 and 2, the large FOV objective lens 40 can be arranged similar to the objective lens 120 as part of a pseudo-bistatic scanning system. However, the same source or sample beam can also underfill the entrance pupil of the large NA objective lens 30 in a pseudo-bistatic condition that is used together with a mechanical actuation system to provide the desired scanning. The larger NA through which a signal beam can be collected by the objective lens 30 further reduces the need to impart relative rotations between the objective lens and the sample to accommodate slope variations on the sample surface. The OCT systems 90 and 100 of FIGS. 3 and 4 show arrangements in which both objective lenses having differing NAs and FOVs can share a common scanning system.

For meeting uncertainty goals within tens of nanometers or less such as may be required for measuring freeform optical surfaces, several performance parameters must be considered in the design of the objective lenses. For example, the telecentricity characteristics and distortion mapping of the objective lens directly determines the resulting beam location mapping across scans. Hence, telecentricity and distortion need to be constrained in design and accounted for in the measurement of the sample. Telecentricity is quantified here as the absolute value of the maximum chief ray angle at the image plane across the lateral scanning FOV. In this context with a typical collimated laser beam input, the image plane refers to the best fit surface for the across-scan focal spots conjugate to infinity. This best fit surface is more likely to be curved rather than planar due to the presence of field curvature that is inherent in almost all imaging optical designs unless specifically accounted for via balancing of optical power between elements and/or balancing with other aberrations. The latter is referred to as a flat field solution. It is worth noting that field curvature reduces to Petzval curvature in the absence of astigmatism. In all cases, however, telecentricity and image plane flatness are two independent design criteria.

Distortion mapping can be evaluated as the deviation from an ideal f-θ mapping of the actual beam position on the image plane or another evaluation plane through focus, since a linear mapping of scan angle to beam position is typically desired for scan lenses. For non-telecentric objective lenses, distortion varies through focus. This variation is especially problematic for three-dimensional OCT measurements of optical components, which may have large sag variations on the order of a few millimeters. Moreover, having zero distortion at the best focus image plane does not result in zero distortion through focus with a non-telecentric objective lens. The effect of telecentricity and distortion on the position of the beam on the sample are illustrated in FIG. 6.

Figure 6:
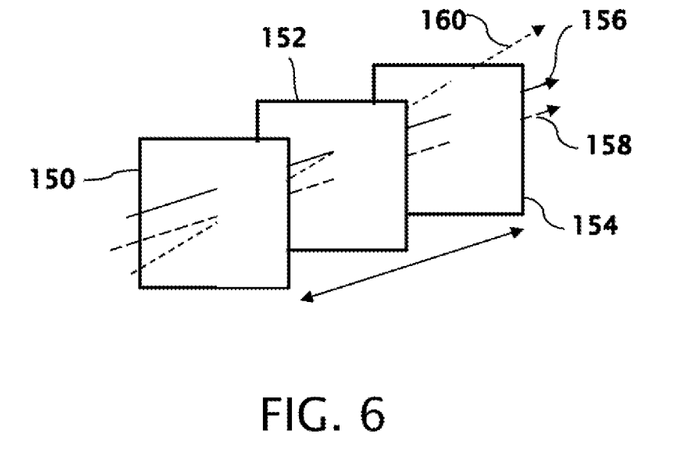
FIG. 6 is a simplified diagram of three rays distinguished by different combinations of telecentricity and distortion characteristics passing through three evaluation planes in different positions through the depth of focus of an objective lens.

The schematic of FIG. 6 shows centroid beam locations at a single scan position within three planes 150, 152, and 154 in different positions through focus. The planes 150 and 154 straddle the middle plane 152 at the best focus position. The centroid ray 156 represents strict telecentricity with no distortion. The centroid ray 158 represents strict telecentricity with some distortion, and the centroid ray 160 represents a departure from telecentricity with no distortion. Achieving both strict telecentricity and zero distortion (ray 156) is often challenging, especially for designs with large FOVs. However, as illustrated in FIG. 6, the experimental calibration for strict telecentricity with some distortion (ray 158) is more straight forward that the calibration for a telecentricity error with no distortion (ray 160) because the distortion error in a telecentric beam (ray 158) displaces the centroid location by a constant amount through focus. Thus, the design process for a highly telecentric low distortion lens should first optimize for high telecentricity over low distortion.

Figure 7:
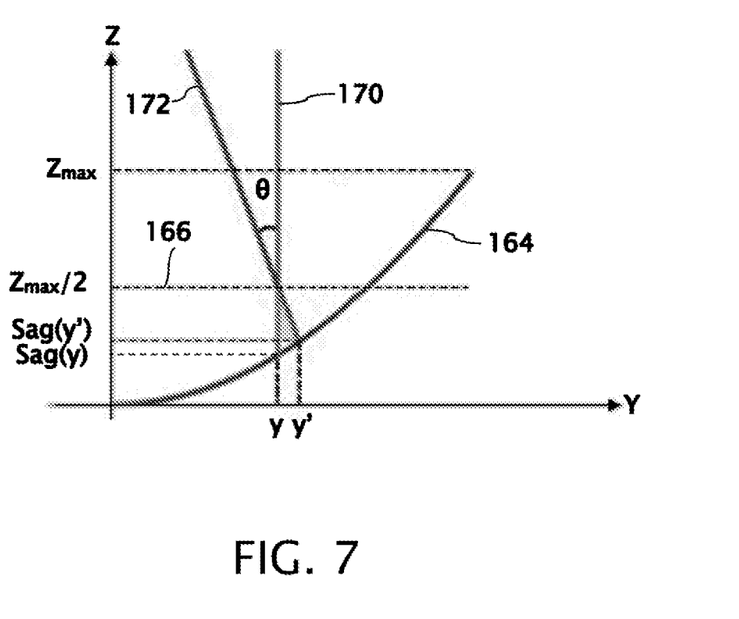
FIG. 7 is a graph showing a cross section of a portion of a sample surface in the form of a parabola defined by axes representing sag and radial dimensions of the surface with a strictly telecentric ray and a non-telecentric ray intersecting different points along the parabola as an illustration of measurement errors associated with departures from telecentricity.

A tolerance for departures from strict telecentricity of an objective lens intended for a metrology application can be quantified with respect to the desired limit of measurement uncertainty. To this end, a simple two-dimensional model of a parabolic surface intended for measurement is shown in FIG. 7. While a parabola 164 is chosen as a well-defined shape to yield analytic solutions, the results are also meaningful for other surface shapes such as conics, off-axis conics, toroids, and freeforms of similar sag and slope values intended to be measured by the OCT metrology system. Since such OCT systems gather data in the form of a point cloud, the systems are largely decoupled from the surface under test and make no assumption of rotational invariance. For this model, a best focus plane 166 is placed halfway of the total surface sag, denoted as $Z_{max}$, with designated zero-distortion at this plane 166. Two chief rays 170 and 172 are shown. The chief ray 170 represents strict telecentricity, and chief ray 172 represents a ray that departs from strict telecentricity through angle θ. Telecentricity is assumed to be zero on-axis and linearly increasing (i.e., increasing in angle θ) toward the edge of the scanning FOV, a scenario not uncommon in many scan lens designs.

As shown in the graph of FIG. 7, the ray 170 representing strict telecentricity intersects the parabola 164 at a position along the Z sag axis designated as sag(y) and at a position along the Y radial axis designated as y, and the ray 172 representing a departure from telecentricity intersects the parabola at a position along the Z sag axis designated as sag(y') and at a position along the Y radial axis designated as y'. The resulting measurement error λ due to the departure from telecentricity can be identified as follows:

$$\Delta = sag(y') - sag(y), \text{ given that:}$$

$$sag(y) = y^2/2R \text{ and}$$

$$sag(y') = y'^2/2R$$

where R defines the radius of curvature of the parabola.

The angular measure for telecentricity error θ is related by the following expression:

$$\tan(\theta) = \frac{y' - y}{\frac{Z_{max}}{2} - sag(y')}.$$

Figure 8:
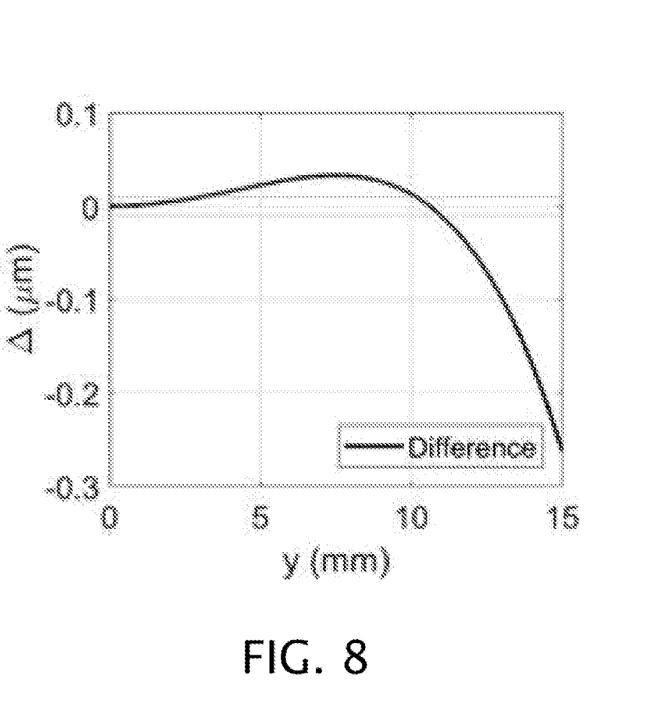
FIG. 8 is a plot of measurement errors associated with departures from telecentricity and increasing surface slope for the sample surface modeled by the parabola of FIG. 7.

As a representation of small freeform optical component having a corresponding maximum sag and slope, a 30-mm diameter parabola is chosen with a 2-mm maximum sag and a 15-degree maximum slope, setting the radius of curvature of the parabola at 56.25 mm. As shown in the plot of FIG. 8 of measurement error $\Delta$ over a range of radial distances along the Y axis, the location of highest slope and largest non-telecentricity ($\theta$=0.0005 degrees or 1.8 minutes) results in the maximum measurement error approaching 0.3 µm. Based on the representative parabola, the maximum telecentricity error must be constrained to 0.00001 degrees or 0.036 arcseconds to maintain the measurement error within a ±10 nm range.

In an OCT interferometric system, the sag of the sample surface under test at a specific location in the lateral scan is encoded as an OPD between the sample arm and the reference arm. Therefore, any factor other than the sample that may alter the optical path length of one arm with respect to the other can introduce uncertainty into the sag measurement. For example, aberrations introduced by the optical components in the path of the light beams can affect the OPD between the arms. This is especially true for pseudo-bistatically configured objective lenses, where the optical path length of light taking different routes through the objective lens to and from the sample should remain of equal optical path length. For example, a point on the sample surface at zero sag and a fifteen-degree slope should be recorded as at the same distance as a point on the sample surface at zero sag and a zero slope. The scanning objective lens should therefore be designed to have diffraction limited performance as-built, defined here as having RMS wavefront error (RMSWE) less than 0.07$\lambda$ at the reference wavelength $\lambda$.

A related consideration is a mismatch between the optical components within the reference and sample arms. Even if the optics of the two arms are as closely matched as possible, in practice no two sets of optics are exactly alike. A method to mitigate for this aspect is to fold the two arms into one, i.e. having a common-path configuration, where the reference surface is as close to the sample surface as possible, such as within the depth of focus of the probing beam as evident in the OCT system 100 of FIG. 4. The working distance of the objective lens must be sufficiently long to accommodate the diversion of light into the reference arm. This configuration can also accommodate a non-flat reference surface, enabling the reference reflector to be constructed as a reference sphere, a reference conic, a reference off-axis conic, a reference toroid, or even a freeform master. Locating the reference and the sample surface closer together optically is also expected to mitigate for the sensitivity roll-off with depth typical of OCT systems.

Another design consideration involves the optical path length of the probing beam as it is scanned across the FOV. A surface formed by the focal spots that are laterally scanned across the FOV define a locus of points of equal optical path lengths to the entrance pupil in the form of an image plane. As the measurand is the difference between the optical path lengths of the reference and sample arms, the image plane can be set as the zero or any other constant OPD surface between the reference and sample arms.

Figure 9:
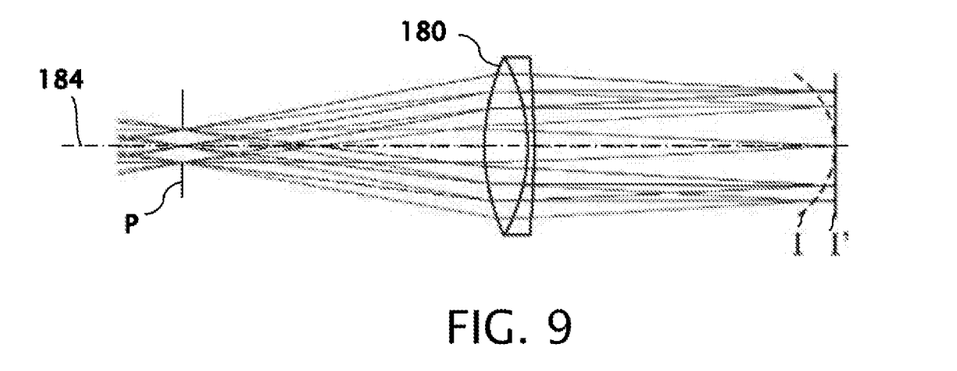
FIG. 9 is a diagram of a simple doublet arranged as a telecentric objective with five differently oriented beams directed through the entrance pupil of the telecentric objective and forming a curved image surface.

A simple setup optimized for high telecentricity with an achromatic doublet as an objective lens 180 is shown in FIG. 9. Five different collimated beams are directed through an entrance pupil P of the objective lens 180, which reach the plane I' through the objective lens 180. While the plane I' contains an image point of the collimated beam delivered along the optical axis 184 of the objective 180, the image points of the remaining off-axis beams lie along the image surface I from which the constant OPD is measured. Unless measurements taken with the objective lens 180 account for the curvature of the image surface I, the measurement results will be biased by the curved surface. For example, a flat sample measured with this objective lens 180 will appear to be curved in the measurement data. In optical design, a flat image plane may be achieved if sufficient degrees of freedom are available by optimizing for diffraction limited performance across a planar image surface. However, if some curvature remains, the measurements can be systematically corrected. In some instances, the curvature of the image surface can be customized to be able to measure sample surfaces of extreme curvatures.

No off-the-shelf lens was found that meets our specifications for minimized uncertainty especially for strict telecentricity. For one application, a wide spectral bandwidth of 360 nm centered at 900 nm is also required. Following our new design methodology, two objective lens system designs have been identified that are both highly telecentric and diffraction limited over a flat image plane. Either or both designs can be used in a pseudo-bistatic configuration as described above.

A recommended design procedure for achieving highly stringent telecentricity requirements and diffraction limited performance over a wide spectral bandwidth in a form balanced with manufacturing and cost considerations begins by constraining telecentricity from the beginning the design processor with a starting point that is designed for strict telecentricity. The value to which telecentricity is constrained does not need to be the smallest value that might be desirable. Some tolerance can accompany the telecentricity constraint to avoid driving the design process into an overly sensitive design form. The telecentricity constraint should also be set to embrace both positive and negative values for the target telecentricity for achieving the desired level of uncertainty in the measurements. In this way, the value of the constraint can be allowed to continuously vary from positive to zero to negative, allowing for a mathematically stable optimization process. Moreover, achieving both diffraction limited performance and stringent telecentricity may require a balance between typical imaging aberrations and pupil aberrations.

During the optimization process, manufacturability should also be constrained along with telecentricity. Specifically, the manufacturability may be assessed by monitoring the angles of incidence on the surfaces of the lenses, which should be constrained to be under certain values. This allows the lens to find a design form that balances both telecentricity, diffraction limited performance, and manufacturability. As the lens design approaches its final form, telecentricity can be gradually constrained to a stricter level.

The stop location can be an effective compensator in the tolerancing of such highly telecentric objective lenses, thus loosening the tolerances on the lens and in turn increasing manufacturability. The stop location compensator and the image plane de-space compensator are quasi-independent of one another; the former compensates for telecentricity while the latter compensates for the imaging performance. As such, when running tolerance simulations, the tolerancing for the telecentricity can be optimized separate from that for the RMSWE (imaging performance).

The stringent telecentricity requirement laid out above may be achieved nominally with trade-off in design complexity and sensitivity. Considering current manufacturing tolerances, the designs reported here minimize residual non-telecentricity while balancing the requirement for diffraction limited performance as well as practical considerations for cost and lead time. The specifications set for the large FOV and large NA designs are shown side by side in Table 1 below for ease of comparison.

TABLE 1

| | Specification Parameter | Large FOV | Large NA |
|---|---|---|---|
| 1 | Spectral range (nm) | 720-1080 | 720-1080 |
| | a. Design wavelength (nm) | 720, 900, 1080 | 720, 900, 1080 |
| | b. Reference wavelength λ (nm) | 900 | 900 |
| | c. Weighting | 1:1:1 | 1:1:1 |
| 2 | Entrance pupil diameter (mm) | 10 | 5.5 |
| 3 | Effective focal length (mm) | 154 | 5 |
| 4 | Image space NA | 0.0324 | 0.55 |
| 5 | Full scanning FOV, diameter (mm) | 40 | 0.088 |
| 6 | Full optical scan angle (°) | ±7.4 | ±0.5 |
| 7 | RMSWE, nominal maximum (λ) | 0.05 | 0.041 |
| 8 | Telecentricity, nominal maximum (°) | 0.00036 | 0.068 |
| 9 | Vignetting (%) | 0 | 0 |
| 10 | F-θ distortion, nominal maximum (μm) | 33.13 | 0.037 |
| 11 | F-θ distortion, nominal maximum (%) | 0.16 | 0.15 |
| 12 | Overall length, vertex to vertex (mm) | 160 | 12 |
| 13 | Working distance (mm) | 100 | 2.5 |

Detailed prescriptions for the two designs are given in Tables 2 and 3. The lens elements prescribed in the tables are also referenced in the layout drawings of the two lenses in FIGS. 10 and 11.

TABLE 2

(Large FOV)

| Lens # | Surface # | Radius (mm) | Thickness (mm) | Material | Diameter (mm) |
|---|---|---|---|---|---|
| L1 | S1 | −250.969 | 7.80 | S-LAH58 | 34.9 |
| | S2 | −37.211 | 5.00 | S-TIM22 | 34.9 |
| | S3 | −151.188 | 5.66 | Air | 34.9 |
| L2 | S4 | −37.216 | 6.00 | S-FSL5 | 39.8 |
| | S5 | −263.560 | 9.02 | Air | 39.8 |
| L3 | S6 | −156.358 | 10.80 | S-LAH58 | 45.9 |
| | S7 | −61.143 | 17.34 | Air | 45.9 |
| L4 | S8 | 189.929 | 9.50 | S-BSM2 | 49.2 |
| | S9 | −75.701 | 5.00 | S-TIH4 | 49.2 |
| | S10 | 155.244 | 63.22 | Air | 49.2 |
| L5 | S11 | 763.000 | 11.50 | S-LAM2 | 70.2 |
| | S12 | −89.198 | 9.50 | S-TIH11 | 70.2 |
| | S13 | −170.067 | 100.00 | Air | 70.2 |

Figure 10:
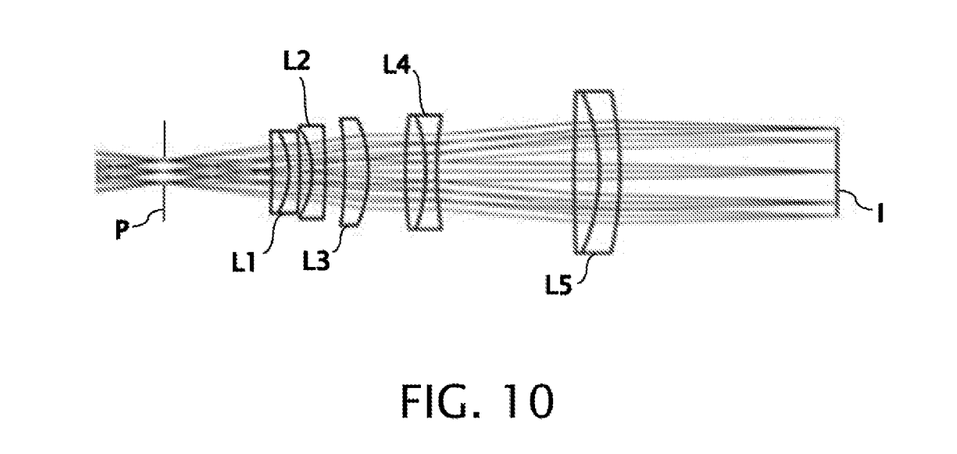
FIG. 10 is a layout of a telecentric objective lens with a large FOV that is designed in accordance with desired performance criteria showing five differently oriented beams brought to focus in different positions along a planar image surface.
Figure 11:
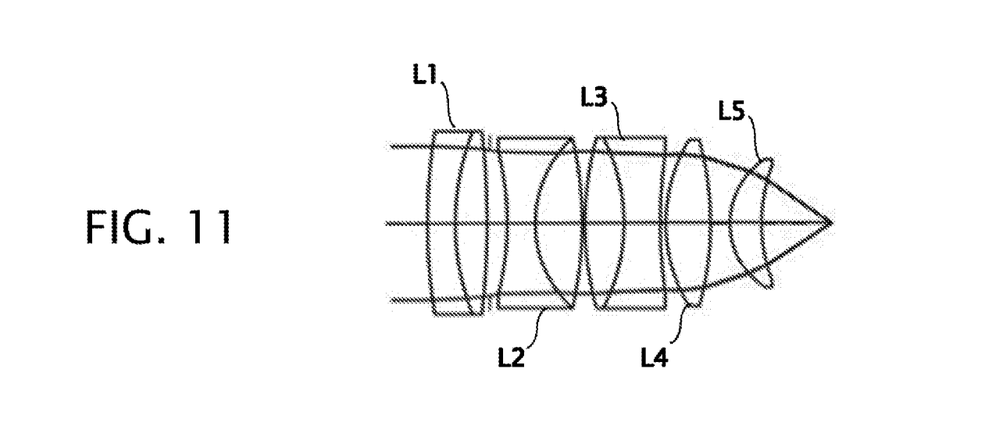
FIG. 11 is a layout of a telecentric objective lens with large NA that is designed in accordance with desired performance criteria showing the focusing of a collimated beam.

The large FOV lens of FIG. 10 is shown with five different ray bundles representing different lateral scanning positions for collimated probing beams that enter the pupil at different angles and focus on the image plane I at different lateral locations.

TABLE 3

(Large NA)

| Lens # | Surface # | Radius (mm) | Thickness (mm) | Material | Diameter (mm) |
|---|---|---|---|---|---|
| L1 | S1 | 20.327 | 1.00 | S-PK57Q1 | 6.2 |
| | S2 | 8.939 | 1.14 | S-NLAF2 | 6.2 |
| | S3 | −28.479 | 0.10 | Air | 6.2 |
| L2 | S4 | −10.193 | 1.00 | S-NKZFS4 | 5.8 |
| | S5 | 4.152 | 1.68 | CAF2 | 5.8 |

TABLE 3-continued (Large NA)

| Lens # | Surface # | Radius (mm) | Thickness (mm) | Material | Diameter (mm) |
|---|---|---|---|---|---|
| | S6 | −13.494 | 0.10 | Air | 5.8 |
| L3 | S7 | 11.525 | 1.39 | S-NKZFS4 | 5.8 |
| | S8 | −6.622 | 1.30 | S-SF4 | 5.8 |
| | S9 | 17.372 | 0.19 | Air | 5.8 |
| L4 | S10 | 5.784 | 1.60 | O-SFPL51 | 5.6 |
| | S11 | −11.144 | 0.69 | Air | 5.6 |
| L5 | S12 | 2.721 | 1.13 | S-NSK11 | 4.2 |
| | S13 | 5.892 | 2.50 | Air | 4.2 |

Figure 12A:
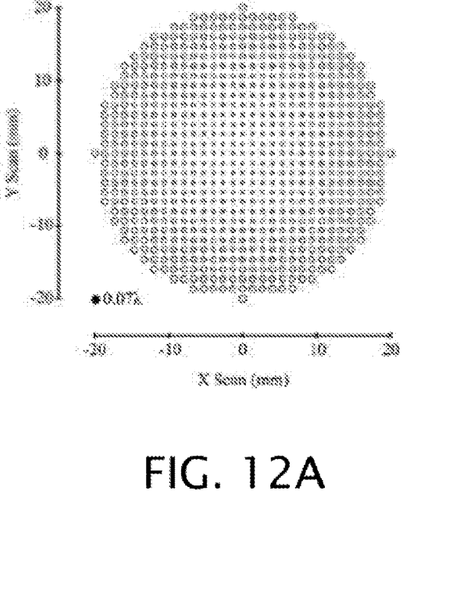
FIGS. 12A and 12B contain plots of root mean squared wavefront errors (RMSWE) over the FOVs of the objective lenses of FIGS. 10 and 11 and demonstrating optical performance within a target of 0.07λ wavefront error.
Figure 12B:
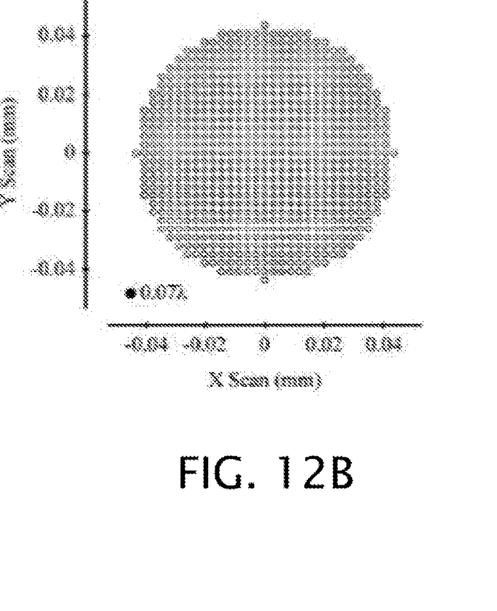
Figure 13A:
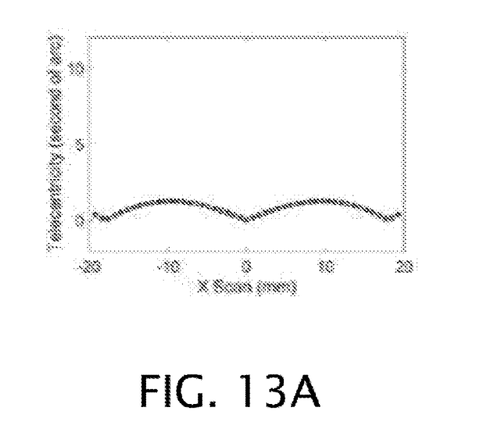
FIGS. 13A and 13B contain plots of residual non-telecentricity over one dimension of the FOVs of the objective lenses of FIGS. 10 and 11 and demonstrating optical performance within a residual non-telecentricity target of 1.5 arcseconds for the objective lens of FIG. 10 and 4.5 arcminutes for the objective lens of FIG. 11.
Figure 13B:
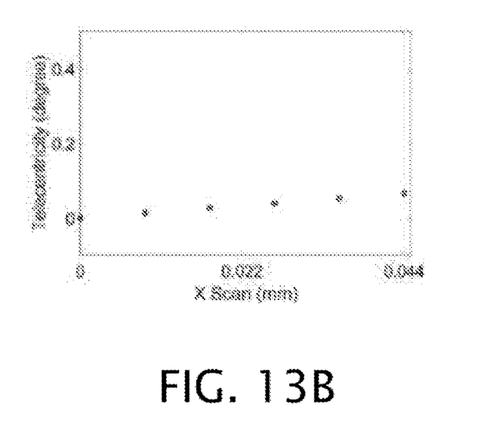

Performance data for the two objective lens systems are plotted in the graphs of FIGS. 12A and 13A for the large FOV lens and in the graphs of FIGS. 12B and 13B for the large NA lens. The nominal RMSWE achieved for the large FOV objective lens is $0.0404\lambda \pm 0.0084\lambda$ with a maximum of $0.0538\lambda$. The nominal telecentricity achieved is 0.8"±0.4" with a maximum of 1.3". For the large NA objective lens, the nominal RMSWE achieved is $0.0345\lambda \pm 0.0030\lambda$ with a maximum of $0.0406\lambda$. The nominal telecentricity achieved is 0.046°±0.016° with a maximum of 0.068°. As both lens systems are rotationally invariant, telecentricity is shown across the lateral scan in one direction in FIGS. 13A and 13B but is representative over the full scanning FOV.

The referenced lenses embody the critical design requirements detailed for a custom OCT sample arm in the context of low uncertainty form metrology for freeform optical components. The pseudo-bistatic objective lens scanning configuration for OCT measurement systems maximizes signal throughput by collecting specular reflections from a range of surface slopes while minimizing OPD error from the optical beam delivery system. The pseudo-bistatic configuration can also be integrated into a compound objective lens OCT system to extend its measurement dynamic range in terms of sample slope and surface roughness.

The invention claimed is:

1. A pseudo-bistatic objective lens system for measuring a sample having a given range of slopes comprising:
   a telecentric objective having an optical axis, a numerical aperture $NA_C$, and an entrance pupil;
   a beam source together with a beam-shaping optic for directing a probing beam through a limited area of the entrance pupil of the telecentric objective;
   the telecentric objective being arranged for focusing the probing beam to spots on the sample through an effective numerical aperture that is smaller than the numerical aperture $NA_C$ of the telecentric objective through which a signal beam can be collected from the spots for extending a depth of focus through which the spots are illuminated; and
   wherein the numerical aperture $NA_C$ of the telecentric objective is set in accordance with the following relationship:

$$NA_C = \sin(\theta_P + 2\alpha_{max})$$

where $\theta_P$ is one-half of a range of angles through which the probing beam is focused, $\alpha_{max}$ corresponds to a given maximum inclination angle of a surface normal of the illuminated spots to the optical axis of the telecentric objective for the given range of slopes for the sample, and $\alpha_{max}$ equal to or greater than $\theta_P$ for returning the signal beam as specularly reflected from one or more of the spots to an offset area of the entrance pupil that is located beyond the limited area of the entrance pupil through which the probing beam is directed.

2. The system of claim 1 further comprising a beam steering device arranged for directing the probing beam through the limited area of the entrance pupil at sequentially varying orientations, and the telecentric objective is arranged to focus the varying orientation probing beam over a range of field positions for sequentially illuminating different spots on the sample.

3. The system of claim 2 in which the telecentric objective provides for collecting the signal beam reflected from the spots for filling different areas of the entrance pupil corresponding to different slopes at which the spots are illuminated.

4. The system of claim 1 in which the limited area of the entrance pupil is centered about the optical axis of the telecentric objective.

5. The system of claim 1 further comprising a mechanical actuator for relatively moving the telecentric objective with respect to the sample for scanning the probing beam across the sample.

6. The system of claim 1 further in which the beam source provides for emitting the probing beam in a form containing a range of wavelengths in a simultaneous or sequential fashion spanning a bandwidth of at least 300 nm.

7. The system of claim 6 of wherein a maximum root mean squared wavefront error of the telecentric objective over the range of field positions as a coefficient of a nominal wavelength of the illumination beam is 0.07.

8. The system of claim 1, wherein the telecentric objective is a first telecentric objective, and further comprising:
    a second telecentric objective having a numerical aperture and an entrance pupil, where the numerical aperture of the first telecentric objective is greater that the numerical aperture of the second telecentric objective;
    wherein the beam source is configured for producing an illumination beam containing a range of wavelengths in a simultaneous or sequential fashion spanning a bandwidth of at least 300 nm;
    further comprising a switching system for directing the illumination beam to one or the other of the first and second telecentric objectives;
    further comprising a beam steering device for directing the illumination beam through a limited area of the entrance pupil of at least the second telecentric objective at sequentially varying orientations, and the second telecentric objective being arranged to focus the varying orientation illumination beam through an effective numerical aperture that is smaller than the numerical aperture of the second telecentric objective over a range of field positions for sequentially illuminating different spots on the sample; and
    further comprising one or more beamsplitters for (a) dividing the illumination beam into one or more sample beams that are directed along respective sample arms to the sample and one or more reference beams that are directed along at least one reference arm to a reference reflector and (b) combining the one or more sample beams as reflected from the sample with the one or more reference beams reflected from the reference reflector into a measurement beam that is directed to a detector/processor.

9. The measuring system of claim 8 in which the beam steering device is associated with the second telecentric objective and a mechanical actuation system provides for relatively moving the first telecentric objective with respect to the sample.

10. The system of claim 1, wherein the telecentric objective comprises:
    first, second, and third cemented doublets, one bi-convex lens, and one positive meniscus lens in order from the entrance pupil,
    wherein the first cemented doublet contributes positive optical power, the second and third cemented doublets together contribute negative optical power;
    a numerical aperture of 0.55;
    a maximum root mean squared wavefront error no more than $0.07\lambda$ at 900 nm, and
    a maximum nominal telecentricity of 0.07 degrees.

11. The system of claim 10, wherein the telecentric objective is broadband achromatic over a continuous spectral range from 720 nm to 1080 nm wavelengths.

12. The system of claim 8, wherein the second telecentric objective comprises:
    a first cemented doublet, a negative meniscus, a positive meniscus, and second and third cemented doublets in order from the second telecentric objective entrance pupil,
    wherein the first cemented doublet contributes positive optical power, the second cemented doublet contributes negative optical power, and the third cemented doublet contributes positive optical power;
    a scanning field of view diameter of 40 mm;
    a maximum root mean squared wavefront error no more than $0.07\lambda$ at 900 nm over the field of view, and
    a maximum nominal telecentricity of 1.3 seconds of arc over the field of view.

13. The system of claim 12, wherein the second telecentric objective is broadband achromatic over a continuous spectral range from 720 nm to 1080 nm wavelengths.

14. The system of claim 8, wherein the first telecentric objective comprises:
    first, second, and third cemented doublets, one bi-convex lens, and one positive meniscus lens in order from the first telecentric objective entrance pupil,
    wherein the first cemented doublet contributes positive optical power, the second and third cemented doublets together contribute negative optical power;
    a numerical aperture of 0.55;
    a maximum root mean squared wavefront error no more than $0.07\lambda$ at 900 nm, and
    a maximum nominal telecentricity of 0.07 degrees.

15. The system of claim 14, wherein the first telecentric objective is broadband achromatic over a continuous spectral range from 720 nm to 1080 nm wavelengths.

16. A measuring method for surfaces exhibiting a range of slopes comprising steps of:
    emitting a source beam containing a range of wavelengths in a simultaneous or sequential fashion spanning a bandwidth of at least 300 nm;
    directing at least a portion of the source beam through a limited area of an entrance pupil of a telecentric objective as a probing beam at sequentially varying orientations;
    focusing the varying orientation probing beam through an effective numerical aperture within the telecentric objective that is smaller than the numerical aperture of the telecentric objective over a range of field positions of the telecentric objective for sequentially illuminating different spots on a surface;

collecting a corresponding signal beam that is reflected from the sequentially illuminated spots for filling different areas of the entrance pupil corresponding to different slopes of the surface at which the spots are illuminated;

conveying a portion of the source beam or the probing beam along a reference arm as a reference beam;

combining the reference beam with the signal beam for forming a measuring beam that is directed to a detector; and evaluating interference phases of the measuring beam over the bandwidth of wavelengths for measuring surface heights of the illuminated spots.

17. The method of claim 16 in which the numerical aperture $NA_C$ of the telecentric objective is set in accordance with the following relationship:

$$NA_C = \sin(\theta_P + 2\alpha_{max})$$

where $\theta_P$ is one-half of a range of angles through which the probing beam is focused, $\alpha_{max}$ corresponds to a given maximum inclination angle of a surface normal of the illuminated spots to the optical axis of the telecentric objective, and $\alpha_{max}$ is equal to or greater than $\theta_P$.

18. The method of claim 16 including a step of sizing the portion of the source beam to occupy the limited area of the entrance pupil, and wherein the different areas of the entrance pupil filled by the collected signal beam progressively depart from the limited area of the entrance pupil with increasing inclination angles of the surface normal of the illuminated spots to the optical axis of the telecentric objective.

19. The method of claim 18 including a step of dividing the focused probing beam into a sample beam that is directed to the surface and the reference beam that is conveyed along the reference arm.

* * * * *